No. 666,556. Patented Jan. 22, 1901.
A. P. PRENTICE.
CAMERA.
(Application filed May 25, 1899.)
(No Model.)
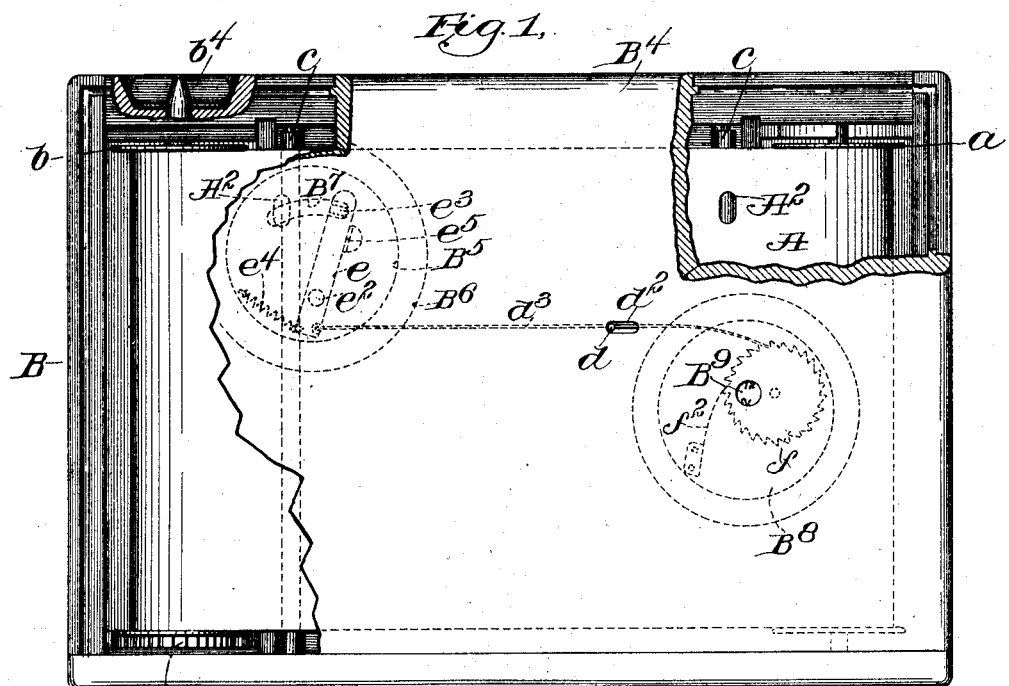
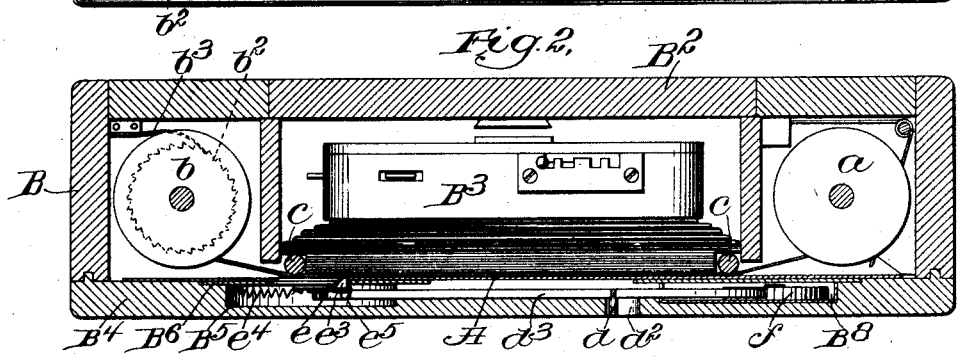
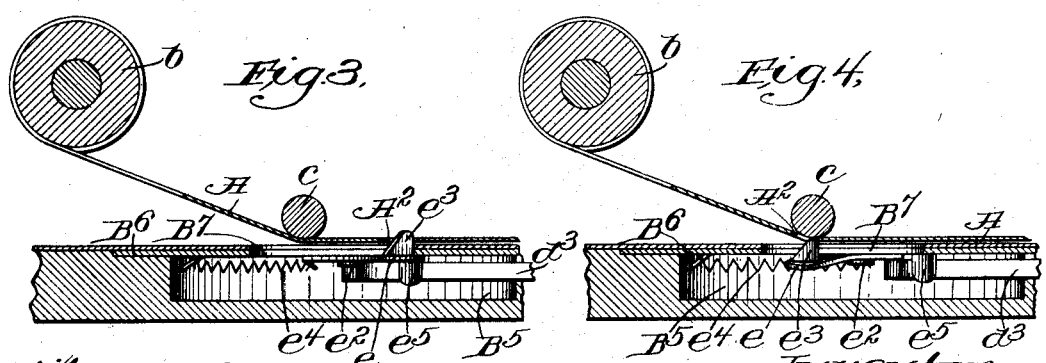
Witnesses
T. F. Kehoe
Jno. Borst
Inventor,
Adrastus P. Prentice
By Philipp Phelps Sanger
Attorneys
THE NORRIS PETERS CO., PHOTO-LITHO., WASHINGTON, D. C.

UNITED STATES PATENT OFFICE.

ADRASTUS P. PRENTICE, OF ROCHESTER, NEW YORK, ASSIGNOR TO THE BLAIR CAMERA COMPANY OF MAINE, OF SAME PLACE.

CAMERA.

SPECIFICATION forming part of Letters Patent No. 666,556, dated January 22, 1901.

Application filed May 25, 1899. Serial No. 718,168. (No model.)

*To all whom it may concern:*

Be it known that I, ADRASTUS P. PRENTICE, a citizen of the United States, residing at Rochester, county of Monroe, and State of New York, have invented certain new and useful Improvements in Cameras, fully described and represented in the following specification and the accompanying drawings, forming a part of the same.

This invention relates to certain improvements in photographic cameras, and more particularly to that type of cameras in which a sheet of film sufficient for a series of exposures is mounted in the camera preferably in the form of a roll, devices being employed to unwind sufficient film from the roll for an exposure and to move it in the proper position to be exposed, the film after exposure being rolled up on another roll, to be subsequently developed. It is desirable that such cameras be provided with devices for indicating when the proper amount of film for a negative has been moved into position for exposure and also with means for registering the amount of film which has been exposed or the number of exposures which have been made, so that the operator may know when the film in the camera is exhausted. Furthermore, since in the thin flat cameras which are now in the market and which are more particularly intended for pocket use the saving of space is of great importance, it is desirable that the indicating and registering mechanisms be so located and disposed as not to in any way increase the size of the camera.

It is one object of this invention to produce an improved indicating device for cameras, roll-holders, and other analogous uses which shall be simple and compact, which shall be of such a character that its operation is brought about by the movement of the film itself, and which shall reliably indicate, either visually or audibly or both visually and audibly, when a sufficient amount of film has been properly positioned for exposure.

A further object of the invention is to produce a simple and compact indicating and registering mechanism which shall be so arranged in the camera as not to require any space additional to that of the ordinary working parts of the camera and which is therefore particularly adapted for use with the thin flat pocket-cameras before referred to.

A further object of the invention is to so arrange the indicating and registering devices as to avoid any leakage of light into the camera through the apertures in which they are located.

With these and other objects in view the invention consists in certain constructions and in certain parts, improvements, and combinations, as will be hereinafter described and more particularly pointed out in the claims hereunto appended.

In the accompanying drawings, which form a part of this specification, and in which like characters of reference indicate the same parts, Figure 1 is a rear elevation of the camera containing one embodiment of the invention, parts of said figure being broken away and the indicating and registering mechanisms being mainly shown in dotted lines. Fig. 2 is a horizontal sectional elevation of the camera shown in Fig. 1, and Figs. 3 and 4 are sectional details on a somewhat larger scale.

The camera is intended to be used with a film A, which is constructed, for instance, by providing it with openings $A^2$, so as to indicate the places where the film is to be cut after the exposure and also to coöperate with the indicating and registering mechanisms, as will be hereinafter described.

While the invention may be applied to a roll-holder of any description or to a film-camera of any kind, it is herein shown as applied to a thin flat pocket-camera comprising a main box or casing B, having a support $B^2$, which is adapted to be turned down in front of the camera to support the bellows extension $B^3$, which contains the lens and the shutter mechanism. As the lens and shutter mechanism form no part of the invention, they are not herein described.

The film is preferably mounted on a roll, as $a$, said roll being contained in a compartment at one end of the box and being mounted in suitable bearings. At the other end of the box is a similar compartment, in which is mounted a winding-roll $b$, the film being drawn across the back of the box from the roll $a$ to the roll $b$. The winding-roll $b$ is preferably provided with a ratchet $b^2$ and a retaining-pawl $b^3$, as is usual in camera constructions, and is adapted to be turned to wind the film by means of a thumb-piece $b^4$, though it may be operated in any desired manner. The film when in operative position extends across the back of the camera, so as to be exposed to the light through the lens-opening, and preferably lies snugly against the back or cover $B^4$ of the box. It is also preferably guided and supported by suitable guides $c$, which are located near the compartments before referred to, said guides being preferably, though not necessarily, in the form of rollers. While the cover $B^4$ is removable for loading and unloading the camera, it must of course be kept closed to protect the film from light while the camera is in use.

In order that the user of the camera may know how far to turn the winding-roll to bring the right portion of the unexposed film into position for the next exposure, the camera is provided with a suitable indicating device. This indicating device is preferably constructed so as to indicate the movement of the film both audibly and visually; but it may indicate either audibly or visually, if desired. While the indicating device may be constructed in various ways to effect the functions named, in the preferred form of the construction the camera or roll-holder is provided with an indicating pin or projection $d$, said pin or projection being located and movable in a recess formed in the cover of the camera, which preferably is in the form of a longitudinal slot $d^2$ and opens to the outside of the cover. While this indicating pin or projection may be variously supported and operated, in the preferred construction it is supported upon and operated by a thin metal strip $d^3$, which is preferably located in a channel or perforation extending through the material which forms the back of the cover $B^4$. The pin or projection $d$ is arranged to be moved in the slot $d^2$ at proper times, said times coinciding with the proper positioning of a fresh portion of the film for exposure. By its movement, therefore, it indicates visually to the user of the camera when an unexposed portion of the film is in position for exposure. It is also preferably caused to convey an audible indication by means which will be hereinafter described.

The actuating mechanism by which the pin $d$ is given its movement in the slot $d^2$ may be variously located and constructed. In its preferred form, however, and as herein shown, it comprises a lever $e$, which is pivoted at $e^2$ on a plate $B^6$. The cover $B^4$ is preferably formed with a recess $B^5$, opening toward the interior of the cover, and the plate $B^6$ overlies this recess, the actuating-lever being thus arranged within the recess. The plate $B^6$ is provided with a slot $B^7$, and through this slot extends a finger or projection $e^3$, said finger or projection being carried on the lever $e$. The projection $e^3$ is arranged to be in contact with the traveling film and to be held thereagainst by spring-pressure. While this result may be accomplished in various ways, it is preferably effected by forming the lever $e$ from thin spring metal. The lever $e$ is normally held in position at one end of the slot $B^7$ by means of a spring $e^4$ and is further provided with a stop $e^5$, the purpose of which is to prevent the traveling film from forcing the spring-lever $e$ back sufficiently far so that the projection $e^3$ will slip out of the slot $B^7$ and pass under the supporting-plate $B^6$. This stop is a supplemental stop merely, and while its use is preferred it may, if desired, be omitted.

As the film is drawn forward by the winding-roll after an exposure, it slides over the projection $e^3$ of the actuating-lever $e$ without moving said lever until one of the slots $A^2$ comes opposite said projection. When this occurs, the projection $e^3$ is engaged by the edge of the slot, and the lever and projection move with the film. This movement of the actuating-lever may be transmitted to the indicating-pin in any suitable manner. Preferably, however, the metal strip $d^3$, which carries the indicating-pin $d$, will be connected to the lever in any suitable manner, as by a pin. The movement of the lever will therefore cause the indicating-pin to move in its slot. By the time the lever $e$ has been moved to the other end of the slot $B^7$ a fresh portion of the film is ready for exposure. The projection $e^3$ must therefore be then disengaged from the film and the lever caused to reassume its normal position in the slot. The disengagement of the projection $e^3$ from the perforation in the film may be variously effected—as, for instance, by causing the film to bend sharply away from the plane in which it has heretofore been traveling. Preferably, however, the projection will be caused at this time to contact with some portion of the camera, so that it will be positively forced out of the perforation in the film. In the construction shown one of the guide-rollers $c$ is so arranged as to be struck by the projection $e^3$ as it reaches the end of the slot $B^7$. The projection $e^3$ will be caused by the movement of the film to ride up on the roller $c$ and will thus be forced out of the perforation in the film. In order that the projection $e^3$ may readily ride up on the roller, one of its edges is preferably beveled, as is clearly shown in Figs. 3 and 4, and in order that it may be readily disengaged from the film it preferably has its lower end rounded. After the projection $e^3$ has been disengaged from the perforation in the film it is thrown smartly back to its normal position in the slot $B^7$. This quick movement of the lever is transmitted, of course, through the strip $d^3$ to the pin $d$ and causes it to be thrown sharply back to its normal position in the slot $d^2$, this operation producing a click or snap, which audibly indicates to the user that a fresh portion of the film is in position for exposure.

While the indicating mechanism hereinbefore described may be used without a registering mechanism, such a mechanism is preferably provided in order that the user may be accurately informed as to the amount of unexposed film in his camera. This registering mechanism may be constructed in various ways. Preferably, however, the cover $B^4$ will be provided with a recess or pocket $B^8$, in which is located a registering-wheel $f$. This registering-wheel will be provided with a series of numbers which show through an aperture $B^9$, suitably formed in the cover. The registering-wheel $f$, which is shown as suitably mounted in said recess or pocket $B^8$, may be operated in any suitable or desired manner. Preferably, however, it is operated from the actuating-lever $e$ and simultaneously with the movement of the indicator $d$. In order to effect this, the strip $d^3$, which carries the indicating-pin $d$, is prolonged and has its end bent to form a push-pawl, which engages with a suitable ratchet formed on the circumference of the registering-wheel. A suitable pawl $f^2$ is also provided to prevent backward movement of the registering-wheel.

The operation of the device will be readily understood from what has already been said, taken in connection with a brief description. After an exposure has been made the roll $b$ is turned by the thumb-piece $b^4$, and the exposed portion of the film is wound up on the said roll. As the film travels under the projection $e^3$ it produces no movement of the projection until one of the perforations $A^2$ comes opposite said projection. When this occurs, the projection drops into the perforation, and the further movement of the film causes the lever $e$ to swing on its pivot, this movement being continued until the beveled edge of the projection $e^3$ strikes the guide-roller $c$. When the beveled edge of the projection $e^3$ strikes the roller $c$, the spring-lever $e$ permits it to ride up on the said roller, thus disengaging the projection $e^3$ from the perforation $A^2$ in the film. When this occurs, the spring $e^4$ throws the lever $e$ back into its normal position, thus causing the pin $d$, which has been moved in its slot by means of the connection $d^3$, to be moved quickly back, there being a stop to limit such movement and to be engaged by some one of the moving parts to produce a snap or click and giving an audible indication that a new portion of the film has been placed in position for exposure. The forward movement of the projection $d$ is also accompanied by a rotation of the indicator-wheel $f$, so that said indicator-wheel will show a new figure through the perforation $B^9$.

It will be seen by locating the actuating, indicating, and registering mechanisms in recesses in the cover, as described, a construction is produced in which no extra space is required for the accommodation of these mechanisms. Furthermore, by arranging the registering and indicating mechanisms at a distance from the actuating mechanism and connecting them by a narrow strip located in a channel the danger of leakage of light into the camera from the perforations $B^5$ and $B^9$ is obviated, and at the same time an exceedingly compact, simple, and cheap construction is produced. It is to be understood, however, that many modifications of the several devices may be made and their location and arrangement may be widely varied. The invention is not, therefore, to be limited to the specific construction described, nor to the specific arrangement of the several parts, nor to the specific devices for operating the several parts.

I claim—

1. The combination with means for advancing film, of a device for indicating when a certain amount of film has been advanced, and means for operating said indicating device, said means including a part which is yieldingly pressed against the surface of the film by means actuated independently of the advancing film and is adapted to be moved at certain times by the film, substantially as described.

2. The combination with means for advancing film, of a device for audibly indicating when a certain amount of film has been advanced, and means for operating said indicating device, said means including a part which is yieldingly pressed against the surface of the film by means actuated independently of the advancing film and is adapted to be moved at certain times by the film, substantially as described.

3. The combination with means for advancing film, of a device for audibly and visually indicating when a certain amount of film has been advanced, and means for operating said indicating device, said means including a part which is yieldingly pressed against the surface of the film by means actuated independently of the advancing film and adapted to be moved at certain times by the film, substantially as described.

4. The combination with a casing having a recessed side, of means for supporting and advancing a perforated film, a device for indicating when a definite portion of the film has been moved, and means made effective by the movement of the film for operating said device, the indicating device and the operating means therefor being carried by and located in the recessed side of the casing.

5. The combination with a casing, of means for advancing film, a device for indicating when a definite portion of the film has been moved, and means actuated by the movement of the film for operating said device, said indicating device and actuating means being mounted on and carried by one of the sides of the casing, substantially as described.

6. The combination with a casing, of means for advancing film, an indicating device, a registering device, and a common operating means for both devices made effective by the movement of the film, the devices and operating means being mounted upon and carried by one of the sides of the casing, substantially as described.

7. The combination with a casing, of means for advancing film, an indicating device, a registering device, and a common operating means for both devices made effective by the movement of the film, the devices and operating means being mounted upon and carried by a side of the casing which is substantially parallel to the plane in which the film moves, substantially as described.

8. The combination with a casing having a suitably-recessed side, of means for advancing film in a plane which is parallel to said recessed side, an indicating device, a registering device, and means for operating said devices made effective by the movement of the film, the devices and operating means being located in the recessed side, substantially as described.

9. The combination with a casing having a recessed side, of rolls for supporting and advancing a perforated film, a device for indicating when a definite portion of the film has been advanced, and operating means for said device located in the recess in the side, said means having a part which is adapted to engage successive perforations in the film as the same is advanced, substantially as described.

10. The combination with a casing having a suitably-recessed side, of means for advancing film, an indicating device, operating means therefor, said indicating device and operating means being located in the recessed side, and said operating means including a part which is arranged to be yieldingly pressed against the film and to be operated by the film at predetermined intervals, substantially as described.

11. The combination with a casing having a suitably-recessed side, of means for advancing film, an indicating device, a registering device, operating means for said indicating and registering devices, said devices and operating means being located in the recessed side, and said operating means including a part which is arranged to be yieldingly pressed against the film and to be operated thereby at predetermined intervals, substantially as described.

12. The combination with a casing having a suitably-recessed side, of means for advancing film, an indicating device located in the recessed side and adapted to be operated after a certain amount of film has been advanced, actuating mechanism therefor also located in the recessed side and including a part which is yieldingly pressed against the surface of the film and which is adapted to be moved thereby at predetermined intervals, and means for positively disengaging said part from the film after it has been moved a certain distance, substantially as described.

13. The combination with means for advancing film, of an indicating device adapted to be operated after a certain amount of film has been advanced, a registering device, actuating mechanism for said indicating and registering devices including a part which is yieldingly pressed against the surface of the film and which is adapted to be moved thereby at predetermined intervals, and means for positively disengaging the said part from the film after it has been moved a certain distance, substantially as described.

14. In a casing having a suitably-recessed side, the combination with means for advancing film, of an indicating device located in the recessed side and adapted to be moved after a certain amount of film has been advanced, a registering device located in the recessed side, actuating mechanism for said indicating and registering devices also located in the recessed side and including a part which is yieldingly pressed against the surface of the film and which is adapted to be moved thereby at predetermined intervals, and means for disengaging said part from the film after it has been moved a certain distance, substantially as described.

15. The combination with means for advancing film, of a registering mechanism adapted to register the number of exposures, means for operating said registering mechanism, said means including a part which is yieldingly pressed against the surface of the film and is adapted to be moved at certain times by the film, and means for positively disengaging said part from the film, substantially as described.

16. The combination with a casing, of means for advancing film, mechanism adapted to register the number of exposures, means made effective by the movement of the film for operating said registering mechanism, said registering mechanism and operating mechanism being carried by a side of the casing, substantially as described.

17. The combination with the casing having a suitably-recessed side or cover, of a registering mechanism, suitable operating means therefor made effective by the movement of the film, said registering mechanism and operating means being located in the recessed side, substantially as described.

18. The combination with a casing having a suitably-recessed side or cover, of means for advancing film, a registering mechanism, an operating mechanism therefor, said registering and operating mechanisms being located in the recessed side and said operating mechanism having a part which is adapted to be yieldingly pressed against and engaged by the film at certain intervals, and means for disengaging said part from the film, substantially as described.

19. The combination with a casing having a recess in a side thereof, of an indicating device located in the recess, a second recess in said side, an actuating mechanism located in the second recess, and a connection between the operating mechanism and the indicating device, said connection being located below the face of the side of the casing which contains the recesses, substantially as described.

20. The combination with a casing having three recesses in its side or cover, of a registering mechanism located in one recess, an indicating mechanism located in a second recess, an operating mechanism located in a third recess, and connections between the operating mechanism and the indicating and registering mechanisms lying below the face of the side of the casing which contains the recesses, substantially as described.

21. The combination with means for advancing film, of an indicating device, a registering device, a common actuating mechanism for said indicating and registering devices, said mechanism including a part which is arranged to be engaged by the film at certain times and to be moved thereby, and means for positively disengaging said part from the film at the end of a predetermined movement thereof, substantially as described.

22. The combination with means for advancing film, of an indicating device, a registering device, a common actuator mechanism for said indicating and registering devices, said mechanism including a part which is arranged to be engaged by the film at certain times and to be moved thereby, means for positively disengaging said part from the film at the end of a predetermined movement thereof, and means for quickly returning the actuating mechanism to its normal position, substantially as described.

23. The combination with means for advancing film, of an indicating mechanism, a yielding finger adapted to actuate said mechanism and having a part which is in contact with the film whereby the yielding finger is moved at predetermined intervals, means lying in the path of movement of the finger for disengaging the finger from the film, and means for restoring said finger to its normal position, substantially as described.

24. The combination with means for advancing film, of an indicating mechanism, a registering mechanism, a spring-finger adapted to actuate said indicating and registering mechanisms and having a part which is in contact with the film whereby the spring-finger is moved at predetermined intervals, means lying in the path of movement of the finger for disengaging the finger from the film, and means for restoring said finger to its normal position, substantially as described.

25. The combination with means for advancing film, of an indicating mechanism, means for operating said mechanism, said means including a part which is yieldingly pressed against the surface of the film and is adapted to be moved at certain times by the film, and means for positively disengaging said part from the film, substantially as described.

26. The combination with means for advancing film, of an indicating mechanism, a finger having a projection which is yieldingly pressed against the surface of the film and which is adapted at certain times to be engaged by the film and moved thereby, said projection having an inclined side, and means lying in the path of movement of the projection with which the inclined side of the projection contacts and by which it is raised out of engagement with the film, substantially as described.

27. The combination with means for advancing film, of an indicating mechanism, a spring-finger having a part which is in contact with the film and which is engaged and moved by the film at predetermined intervals, means lying in the path of movement of the finger for disengaging the finger from the film, a stop for limiting the disengaging movement, and means for restoring the finger to its normal position, substantially as described.

28. The combination with means for advancing film, of an indicating mechanism, a spring-finger provided with a projection having an inclined side, said projection being engaged by the film at predetermined intervals and moved thereby, means lying in the path of movement of the projection, said means operating to disengage the projection from the film, and a stop for limiting the disengaging movement of the projection, substantially as described.

29. The combination with a casing having means for supporting film, and winding-rolls, of guides for the film located near said rolls, a cover for said casing lying substantially in contact with the film between said guides, an indicating mechanism carried in the cover, an operating mechanism for said indicating mechanism also carried in the cover and having a movable part which is yieldingly pressed against the film and is adapted to be operated by the film at predetermined intervals, said movable part being arranged to contact with one of the guides at the end of its movement in one direction whereby it is disengaged from the film, and means for returning said movable part to its normal position, substantially as described.

30. The combination with the spring-finger $e$ provided with the projection $e^3$, of the roll $c$ in the path of said projection, the connecting member $d^3$ carrying the indicator $d$, and the recording-wheel $f$ adapted to be actuated by the said connecting member $d^3$, substantially as described.

31. The combination with a winding-roll for film, of a finger adapted to enter perforations in said film and to be thus engaged by and moved with the film, means for disengaging said finger from the film, a spring for restoring said finger to its normal position after it is thus disengaged, and an indicator connected with said finger and adapted to travel therewith while the finger moves with the film and to snap back to its normal position when said finger is disengaged, substantially as described.

32. The combination with a winding-roll for film, of a finger adapted to enter perforations in said film and to be thus engaged by and moved with the film, means for disengaging said finger from the film, a spring for restoring said finger to its normal position after it is thus disengaged, a visual indicator connected with said finger and adapted to travel therewith while the finger moves with the film and to snap back to its normal position when said finger is disengaged, a registering device adapted to be advanced by said finger as it travels with the film, and means for holding said registering device in its advanced position when the finger returns to its normal position, substantially as described.

33. The combination with means for advancing film, of a cover or side having a suitable recess, a slotted plate closing said recess, a lever pivoted to the plate and carrying a projection extending through the slot and adapted at certain times to be engaged by the film, means for disengaging the lever from the film, and a stop for preventing the lever from being moved sufficiently to disengage its projection from the slot, substantially as described.

34. The combination with means for advancing perforated film, of a cover or side having a recess therein, a slotted plate closing said recess, a lever pivoted to the plate and having a projection extending through the slot, said projection being adapted to engage the perforations in the film and being moved thereby, means for disengaging the projection from the film, means for preventing movement of the projection sufficient to disengage it from the slot, a second recess in the cover or side, an indicating device mounted in said second recess, and connections between the lever and indicating device, said connections extending through a channel or perforation in the cover, substantially as described.

35. The combination with means for advancing perforated film, of a cover or side having a recess therein, a slotted plate closing said recess, a lever pivoted to the plate and having a projection extending through the slot, said projection being adapted to engage the perforations in the film and being moved thereby, means for disengaging the projection from the film, means for preventing movement of the projection sufficient to disengage it from the slot, a second recess in the cover, a registering device located in said second recess, and connections between the lever and the recording device, said connections extending through a channel or perforation in the cover, substantially as described.

36. The combination with means for advancing perforated film, of a cover or side having a recess therein, a slotted plate closing said recess, a lever pivoted to the plate and having a projection extending through the slot, said projection being adapted to engage the perforations in the film and being moved thereby, means for disengaging the projection from the film, means for preventing movement of the projection sufficient to disengage it from the slot, a second recess in the cover or side an indicating device mounted in said second recess, a third recess in the cover or side, a registering-wheel mounted in said third recess, means for closing said third recess, and a common actuating device and common connections for operating the registering-wheel and the indicating device, said connections extending through a channel or perforation in the cover, substantially as described.

37. In a camera or roll-holder, the combination with means for supporting and advancing the perforated film, of a registering mechanism, an operating device therefor, said device being supported independently of the film supporting and advancing means and including means for normally pressing it toward the film so that it will pass into the perforations therein as they come into register with it, and connections between said device and the registering mechanism, substantially as described.

38. In a camera or roll-holder, the combination with means for supporting and advancing a perforated film, of a spring-controlled lever which is normally pressed toward the film whereby it may engage the perforations therein, a registering mechanism, and means whereby the lever operates said registering mechanism, substantially as described.

39. In a camera or roll-holder, the combination with means for supporting and advancing a perforated film, of a spring-controlled lever supported independently of the film supporting and advancing means and which is normally pressed toward the film whereby it may engage the perforations therein, a registering mechanism, and means whereby the lever operates said registering mechanism, substantially as described.

40. In a camera or roll-holder, the combination with a casing having a recessed side, of rolls for supporting and advancing a perforated film, a registering mechanism, an operating device therefor mounted in said recessed side, said device being supported independently of the film supporting and advancing rolls and being normally pressed toward the film so that it will pass into the perforations therein as they come into register with it, and connections between said device and the registering mechanism.

41. In a camera or roll-holder, the combination with a casing having a recessed side, of rolls for supporting and advancing a perforated film, a lever mounted in said recessed side and normally pressed toward the film, whereby it may engage the perforations therein, a registering mechanism and means whereby the lever operates said registering mechanism, substantially as set forth.

42. In a camera or roll-holder, the combination with rolls for supporting and advancing a perforated film, of a lever supported independently of the film supporting and advancing means and normally pressed toward the film, whereby it may engage the perforations therein, a registering mechanism, and means whereby the lever operates said registering mechanism.

In testimony whereof I have hereunto set my hand in the presence of two subscribing witnesses.

ADRASTUS P. PRENTICE.

Witnesses:
CHARLES E. MARTIN,
HORACE W. HOOKER.